(12) United States Patent
Kim et al.

(10) Patent No.: US 10,237,860 B2
(45) Date of Patent: Mar. 19, 2019

(54) METHOD AND APPARATUS FOR TRANSMITTING AND RECEIVING DATA IN WIRELESS COMMUNICATION SYSTEMS

(71) Applicant: Samsung Electronics Co., Ltd., Gyeonggi-do (KR)

(72) Inventors: Youn-Sun Kim, Gyeonggi-do (KR); Ki-Il Kim, Gyeonggi-do (KR); Ju-Ho Lee, Gyeonggi-do (KR); Hyo-Jin Lee, Gyeonggi-do (KR); Joon-Young Cho, Gyeonggi-do (KR); Hyoung-Ju Ji, Seoul (KR); Seung-Hoon Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 144 days.

(21) Appl. No.: 14/375,108

(22) PCT Filed: Jan. 28, 2013

(86) PCT No.: PCT/KR2013/000668
§ 371 (c)(1),
(2) Date: Jul. 28, 2014

(87) PCT Pub. No.: WO2013/112020
PCT Pub. Date: Aug. 1, 2013

(65) Prior Publication Data
US 2015/0003316 A1 Jan. 1, 2015

(30) Foreign Application Priority Data
Jan. 27, 2012 (KR) .................. 10-2012-0008326

(51) Int. Cl.
*H04L 5/00* (2006.01)
*H04W 72/04* (2009.01)
(Continued)

(52) U.S. Cl.
CPC ........ *H04W 72/042* (2013.01); *H04B 7/2656* (2013.01); *H04L 5/005* (2013.01);
(Continued)

(58) Field of Classification Search
CPC .......................... H04W 24/10; H04W 72/1273
See application file for complete search history.

(56) References Cited

U.S. PATENT DOCUMENTS 9,059,826 B2 * 6/2015 Han ...................... H04L 5/0048
9,179,466 B2 * 11/2015 Abe .................... H04W 72/082
(Continued)

FOREIGN PATENT DOCUMENTS

KR    10-2010-0137357    12/2010
KR    10-2011-0020668    3/2011
(Continued)

OTHER PUBLICATIONS

International Search Report dated May 7, 2013 in connection with International Patent Application No. PCT/KR2013/000668, 5 pages.
(Continued)

*Primary Examiner* — Asad M Nawaz
*Assistant Examiner* — Berhanu D Belete

(57) ABSTRACT

The present invention relates to a method for transmitting data from a base station to a terminal in a wireless communication system, wherein the method includes the steps of: determining a terminal for transmitting downlink data; when the downlink data is transmitted, confirming the kind of subframe in which the downlink data is transmitted; when the subframe is a normal subframe, transmitting the downlink data on the basis of a cell specific reference signal (CRS) or a demodulation reference signal (DMRS); and, when the subframe is a multimedia broadcast multicast service signal frequency network (MBSFN) subframe, transmitting the downlink data on the basis of the DMRS.

40 Claims, 8 Drawing Sheets

(51) Int. Cl.
*H04W 4/06* (2009.01)
*H04B 7/26* (2006.01)
*H04L 12/18* (2006.01)
*H04B 7/06* (2006.01)

(52) U.S. Cl.
CPC .......... *H04L 5/0055* (2013.01); *H04L 5/0094* (2013.01); *H04W 4/06* (2013.01); *H04B 7/068* (2013.01); *H04B 7/0617* (2013.01); *H04B 7/0678* (2013.01); *H04L 12/189* (2013.01)

(56) References Cited

U.S. PATENT DOCUMENTS

| | | | |
|---|---|---|---|
| 9,392,480 B2* | 7/2016 | Yuda | H04L 1/0026 |
| 2010/0273506 A1* | 10/2010 | Stern-Berkowitz | G01S 5/0009 455/456.1 |
| 2010/0323709 A1* | 12/2010 | Nam | H04B 7/043 455/450 |
| 2011/0044250 A1* | 2/2011 | Han | H04B 7/0689 370/328 |
| 2011/0077038 A1* | 3/2011 | Montojo | H04B 7/024 455/507 |
| 2011/0085503 A1* | 4/2011 | Nam | H04B 7/0452 370/329 |
| 2011/0171955 A1 | 7/2011 | Acharya | |
| 2011/0200137 A1* | 8/2011 | Han | H04L 5/0048 375/295 |
| 2011/0235743 A1* | 9/2011 | Lee | H04L 5/0048 375/295 |
| 2011/0275363 A1* | 11/2011 | Kwon | H04L 5/00 455/422.1 |
| 2012/0039220 A1* | 2/2012 | Chen | H04L 5/0053 370/279 |
| 2012/0099536 A1* | 4/2012 | Lee | H04L 5/0051 370/328 |
| 2012/0155338 A1* | 6/2012 | Noh | H04L 5/0023 370/280 |
| 2012/0155561 A1* | 6/2012 | Seo | H04B 7/15542 375/260 |
| 2012/0213145 A1* | 8/2012 | Aminaka | H04B 7/2606 370/312 |
| 2012/0213147 A1* | 8/2012 | Noh | H04L 5/0026 370/315 |
| 2012/0220327 A1* | 8/2012 | Lee | H04W 72/1273 455/509 |
| 2012/0320841 A1 | 12/2012 | Miki et al. | |
| 2013/0064216 A1* | 3/2013 | Gao | H04W 72/04 370/330 |
| 2013/0094411 A1* | 4/2013 | Zhang | H04W 72/04 370/281 |
| 2013/0136095 A1* | 5/2013 | Nishio | H04L 5/0007 370/329 |
| 2013/0142121 A1* | 6/2013 | Han | H04B 7/0689 370/328 |
| 2013/0178220 A1* | 7/2013 | Lee | H04L 5/0007 455/450 |
| 2013/0294282 A1* | 11/2013 | Seo | H04W 24/10 370/252 |
| 2013/0301597 A1* | 11/2013 | Kim | H04W 72/042 370/329 |
| 2014/0092832 A1* | 4/2014 | Han | H04L 1/1861 370/329 |
| 2014/0192700 A1* | 7/2014 | Lee | H04W 72/005 370/312 |
| 2014/0286275 A1* | 9/2014 | Park | H04L 5/0053 370/329 |
| 2014/0355493 A1* | 12/2014 | Niu | H04W 76/40 370/280 |

FOREIGN PATENT DOCUMENTS

| | | |
|---|---|---|
| WO | WO 2011/020062 A2 | 2/2011 |
| WO | WO 2011/087042 A1 | 7/2011 |
| WO | WO 2011/103309 A2 | 8/2011 |

OTHER PUBLICATIONS

Written Opinion of International Searching Authority dated May 7, 2013 in connection with International Patent Application No. PCT/KR2013/000668, 6 pages.

* cited by examiner

METHOD AND APPARATUS FOR TRANSMITTING AND RECEIVING DATA IN WIRELESS COMMUNICATION SYSTEMS

CROSS-REFERENCE TO RELATED APPLICATION(S)

The present application claims priority under 35 U.S.C. § 365 to International Patent Application No. PCT/KR2013/000668 filed Jan. 28, 2013, entitled METHOD AND APPARATUS FOR TRANSMITTING AND RECEIVING DATA IN WIRELESS COMMUNICATION SYSTEMS". International Patent Application No. PCT/KR2013/00668 claims priority under 35 U.S.C. § 365 and/or 35 U.S.C. § 119(a) to Korean Patent Application No. 10-2012-0008326 filed Jan. 27, 2012, both of which are incorporated herein by reference into the present disclosure as if fully set forth herein.

TECHNICAL FIELD

The present invention relates to a method of transmitting data in a Distributed Antenna System (DAS) where antennas respectively operated by a plurality of base stations are distributed in a service area of a corresponding base station.

BACKGROUND

From the early stage of providing voice-oriented services, a mobile communication system has evolved into a high-speed and high-quality wireless packet data communication system to provide data and multimedia services. Various mobile communication standards such as High Speed Downlink Packet Access (HSDPA) and High Speed Uplink Packet Access (HSUPA), Long Term Evolution (LTE), Long Term Evolution-Advanced (LTE-A), High Rate Packet Data (HRPD) of the 3rd Generation Partnership Project-2 (3GPP2), and IEEE 802.16 have recently been developed to support high-speed and high-quality wireless packet data communication services. In particular, the LTE system, which is a system developed to efficiently support high speed wireless packet data transmission, maximizes wireless system capacity by using various wireless access technologies. The LTE-A system is an advanced wireless communication system of the LTE system and has improved data transmission capability in comparison with the LTE.

In general, the LTE means a base station and a terminal equipment corresponding to a release 8 or a release 9 of 3GPP standardization group, and the LTE-A means a base station and a terminal equipment corresponding to a release 10 of the 3GPP standardization group. The 3GPP standard group has been progressing standardization with respect to a follow-up release based on the LTE-A system and having improved performance after standardization of the LTE-A system.

The existing 3rd Generation (3G) and 4th Generation (4G) wireless packet data communication systems such as HSDPA, HSUPA, HRPD, and LTE/LTE-A employ an Adaptive Modulation and Coding (AMC) scheme, a channel-sensitive scheduling scheme, and the like to improve transmission efficiency. With the use of the AMC scheme, a transmitter can adjust the amount of transmission data according to the channel state. That is, when the channel state is not 'Good', the transmitter reduces the amount of transmission data to adjust the reception error rate to a desired level, and when the channel state is 'Good', the transmitter increases the amount of transmission data to adjust the reception error rate to the desired level and to efficiently transmit a large volume of information. With the use of the channel-sensitive scheduling-based resource management method, the transmitter selectively provides a service to a user having a good channel state among a plurality of users, thus increasing the system capacity compared to the method of assigning a channel to one user and providing a service to the user with the assigned channel. Such a capacity increase as in the above description is referred to as "multi-user diversity gain". In summary, the AMC method and the channel-sensitive scheduling method each are a method of applying the appropriate modulation and coding techniques at the most-efficient time determined depending on the partial channel state information fed back from a receiver.

The AMC scheme, when used together with a Multiple Input Multiple Output (MIMO) transmission scheme, may include a function of determining the rank or the number of spatial layers of a transmission signal. With regard to this, the AMC scheme determines an optimal data rate in consideration of not only a coding rate and a modulation scheme, but also the number of layers for transmission using MIMO.

Recently, intensive research is being conducted to replace Code Division Multiple Access (CDMA), the multiple access scheme used in the 2nd and 3rd generation mobile communication systems, with Orthogonal Frequency Division Multiple Access (OFDMA) in the next generation system. The 3GPP and 3GPP2 have started their standardizations on the evolved systems employing the OFDMA. The OFDMA scheme may have a capacity increase compared to the CDMA scheme. One of several factors for the capacity increase in the OFDMA scheme is the capability to perform scheduling on the frequency axis (frequency domain scheduling). Although a capacity gain is acquired according to the time-varying channel characteristic using the channel-sensitive scheduling method, it is possible to obtain a higher capacity gain with use of the frequency-varying channel characteristic.

FIG. 1 illustrates a time-frequency resource in an LTE/LTE-A system.

In FIG. 1, a wireless resource transmitted from an eNodeB (eNB) to a terminal is divided into a Resource Block (RB) 101 unit on a frequency axis, and is divided into a subframe 102 unit on a time axis. In the LTE/LTE-A system, the RB generally includes 12 subcarriers and occupies 180 kHz of bandwidth, and the subframe includes 14 OFDM symbol periods and occupies 1 msec of a time period. The LTE/LTE-A system may assign a resource in a subframe unit on the time axis and assign a resource in an RB unit on the frequency axis in performing scheduling.

FIG. 2 illustrates a wireless resource of one subframe and one RB, which is a minimum unit schedulable in a downlink in the LTE/LTE-A system.

The wireless resource shown in FIG. 2 includes one subframe on the time axis and includes one RB on the frequency axis. Such a wireless resource includes 12 subcarriers in a frequency region, includes 14 OFDM symbols in a time region, and thus includes 168 inherent frequency and time position. In the LTE/LTE-A system, each inherent frequency and time positions of FIG. 2 is referred to as a Resource Element (RE).

The following several different types of signals may be transmitted in the wireless resource shown in FIG. 2.

1. Cell specific Reference Signal (CRS): The CRS is a reference signal periodically transmitted for all terminals included in one cell, and may be used by a plurality of terminals.

2. DeModulation Reference Signal (DMRS): The DMRS is a reference signal transmitted for a specific terminal, and is transmitted only when data is transmitted to a corresponding terminal. The DMRS may be configured by a total of 8 DMRS ports. In the LTE/LTE-A system, ports from port 7 to port 14 correspond to DMRS ports and ports maintain the orthogonality in order to prevent generation of interference between them by using a CDM or a FDM.

3. Physical Downlink Shared CHannel (PDSCH): The PDSCH is a data channel transmitted in a downlink, is used by the base station to transmit traffic to the terminal, and is transmitted by using an RE where a reference signal (the CRS or the DMRS) is not transmitted in the data region of FIG. 2.

4. Channel Status Information Reference Signal (CSI-RS): The CSI-RS is used in measuring a channel state of the reference signal for transmitting terminals included in one cell. A plurality of CSI-RSs may be transmitted from one cell.

5. Other control channels (PHICH, PCFICH and PDCCH): The PHICH, PCFICH and PDCCH are used in providing control information required to receive a Physical Downlink Shared CHannel (PDSCH) or in transmitting an ACK/NACK for operating an HARQ with respect to a transmission of an uplink data.

In addition to transmission of the signals enumerated above, the LTE-A system allows configuration of muting, by which a CSI-RS transmitted from another base station can be received without interference by UEs of a corresponding cell. The muting may be applied to a position where the CSI-RS can be transmitted, and in general, the terminal receives a traffic signal by skipping a corresponding wireless resource. In the LTE-A system, the muting is also referred to as zero-power CSI-RS, and this is because the muting is applied to a position of the CSI-RS and a transmission power is not transmitted in a corresponding position due to a characteristic of the muting.

In FIG. 2, the CSI-RS may be transmitted by using a part of the positions (patterns) marked by A, B, C, D, E, F, G, H, I, and J according to the number of antennas for transmission of the CSI-RS. Further, the muting may be also applied to a part of the positions marked by A, B, C, D, E, F, G, H, I, and J. In special, the CSI-RS may be transmitted with two, four or eight REs depending on the number of antenna ports transmitting the CSI-RS. In FIG. 2, when the number of the antenna ports is two, the CSI-RS is transmitted from a half of one pattern, when the number of the antenna ports is four, the CSI-R is transmitted from a whole of the one pattern, and when the number of the antenna ports is eight, the CSI-RS is transmitted by using two patterns. In contrast, in a case of the muting, the CSI-RS is always transmitted by using one pattern unit. That is, the muting may be applied to a plurality of patterns, but cannot be applied to only a part of one pattern when a muting position does not overlap a CSI-RS position. But, the muting may be applied to the partial of one pattern only when the muting position overlaps the CSI-RS position.

Meanwhile, in a cellular system, the reference signal should be transmitted in order to measure a downlink channel state. In the case of the LTE-A system of the 3GPP, the terminal measures a channel state between the base station and the terminal by using a CSI-RS transmitted by the base station. Basically, several factors should be considered in the channel state, here, the downlink interference is included. The downlink interference includes interference signals, thermal noise, and the like caused by antennas belonging to a neighbor base station, and is an important factor when the terminal determines a downlink channel condition. For example, when a base station which has one transmission antenna transmits the reference signal to a terminal which has one reception antenna, the terminal should determine a proportion of symbol energy to interference (Es/Io) by determining symbol-specific energy receivable with a downlink in a reference signal received from the base station and interference to be received simultaneously in a period in which a corresponding symbol is received. The determined Es/Io is informed of to the base station to allow the base station to determine a transmission speed in transmitting data to the terminal with the downlink.

In a case of a general mobile communication system, a base station equipment is disposed in a central point of each cell, and a corresponding base station equipment communicates with a terminal by using one or more antennas positioned in a limited place. As described above, a mobile communication system in which antennas included in one cell are disposed at a same position is called a Centralized Antenna System (CAS). In contrast, a mobile communication system in which antennas (Remote Radio Heads; RRHs) belonging to one cell are located at distributed positions in the cell is called a Distributed Antenna System (DAS).

FIG. 3 illustrates a signal transmitted according to a time in the LTE/LTE-A system.

In FIG. 3, one radio frame corresponding to 10 msec is transmitted. In the LTE/LTE-A system, one radio frame includes ten subframes. In addition, the subframes forming one radio frame are configured with a normal subframe or a Multimedia Broadcast multicast service Single Frequency Network (MBSFN) subframe. With regard to a difference between the normal subframe and the MBSFN subframe, in a case of the normal subframe, the CRS is included in the data region. In contrast, in a case of the MBSFN subframe, the CRS is not included in the data region. In the LTE/LTE-A system, in the case of the MBSFN subframe, since only terminals after a release 10 receive data by using the DMRS, it is not necessary for the CRS to receive the data in the data region. In contrast, in the case of the normal subframe, since not only the terminals after the release 10 but also terminals of a release 8 and a release 9 may receive the data, the CRS needed in receiving the data by the terminals is transmitted. Which subframe is the normal subframe among the subframes in one radio frame and which subframe is the MBSFN subframe among the subframes in one radio frame are informed of from the base station to the terminal by using a higher layer signaling.

FIG. 4 illustrates an example of a distributed disposition of antennas in a normal distributed antenna system.

FIG. 4 corresponds to a distributed antenna system including two cells 400 and 410. The cell 400 includes one high-output antenna 420 and four low-output distributed antennas 440 to 443. The 410 is formed identically to the cell 400. The high-output antenna 420 provides a minimum service to the whole area included in a cell area. In contrast, the low-output distributed antennas 440 to 443 may provide a service based on a fast data speed to limited terminals in a limited area of the cell. In addition, all of the low-output distributed antennas 440 to 443 and the high-output antenna 420 are connected to a central controller (not shown) with 430, and operated according to a scheduling and a wireless resource assignment of the central controller. In the distributed antenna system, one or more antennas may be disposed at a position of one geographically separated antenna. In the present invention, one or more antennas disposed at the same position in the distributed antenna system are referred to as an antenna group (RRH group). In the distributed antenna system shown in FIG. 4, the terminal receives a signal from one geographically separated antenna group. Signals received from other antenna groups affect the terminal as interference.

When the CRS is transmitted in the distributed antenna system as shown in FIG. 4, all antennas included in one cell participate in transmitting the CRS. All antennas included in one cell transmit the CRS, or do not transmit another signal at an RE position where the CRS is transmitted so as not to generate interference in transmitting the CRS from other antennas. That is, when all antennas included in one cell transmit a signal for the CRS, a data signal transmitted based on the CRS is transmitted from all antennas included in a cell. In contrast, when only partial antennas included in one cell transmit the signal for the CRS, an antenna which does not transmit the signal for the CRS does not transmit another signal at the RE position where a corresponding CRS is transmitted so as not to generate interference to the CRS transmitted from other antennas. In addition, the data signal transmitted based on the CRS is transmitted from only antennas transmitting the CRS.

FIG. 5 illustrates transmitting the data signal based on the CRS and transmitting the data signal based on the DMRS in the distributed antenna system.

Referring to FIG. 5, the data is transmitted based on the CRS in a cell 500, and the data is transmitted based on the DMRS in a cell 510. In the data transmission base on the CRS, all antennas included in a cell transmit a signal for a specific terminal. In contrast, in the data transmission based on the DMRS, a portion of the antennas included in the cell transmits a data signal for the specific terminal, but other antennas which do not transmit the data signal for the specific terminal may transmit the data signal to another terminal. In the cell 500, all antennas included in the cell transmit a signal for a UE1. In cell 510, the DMRS is assigned to each of UE3 and UE4 by using two different antennas, and therefore UE3 and the UE4 may receive data.

In the distributed antenna system as shown in FIG. 5, the transmission based on the CRS has advantages and disadvantages as follows compared with the transmission based on the DMRS. When the data is transmitted based on the CRS, since a signal may be transmitted from all antennas of the distributed antenna system, a signal received by the terminal has a comparatively superior Signal to Interference and Noise Ratio (SINR), and as a result, superior reception performance may be obtained. However, since the CRS always exists in the normal subframe, when the data is transmitted by using the DMRS in the normal subframe, a wireless resource to be additionally assigned for the DMRS is required, and therefore, a wireless resource for the data transmission comparatively becomes lower. In addition, the CRS is a common signal usable by all terminals included in the cell, and therefore, different CRSs may not be assigned to each terminal. That is, when a signal is transmitted to a specific terminal by using the CRS, all antennas included in the cell should transmit a signal for this terminal or should not generate another signal. This may incur a problem of assigning an unnecessary wireless resource in the data transmission for the CRS, with regard to a wireless management of the distributed antenna system.

In the LTE/LTE-A system, the base station may set a unique transmission mode to each terminal. Here, the base station selects a transmission mode capable of providing an optimum performance to each terminal in consideration of a channel condition of the terminal, a function implemented to the base station, etc. For example, a transmission mode 9 supported in an LTE/LTE-A release 10 performs a downlink transmission based on the DMRS and may transmit data from a maximum of eight transmission antennas. Separately from such a transmission mode, the LTE/LTE-A system also supports a fallback transmission. The fallback transmission is for transmitting data to a terminal of which a channel condition is not good. For example, when a downlink transmission method according to a transmission mode is not proper for the channel condition of the terminal, the base station changes the transmission mode of the terminal to a more proper mode by using the fallback transmission.

In the fallback transmission, receiving data stably is importance, and therefore, in general, a transmit diversity capable of properly coping with a dynamic change of a wireless channel is utilized. In the normal subframe in which the CRS is included in LTE/LTE-A release 10, the fallback transmission is performed by utilizing a Space Frequency Block Code (SFBC) which is a kind of transmission diversity method. But, in the MBSFN subframe in which the CRS is not included, the fallback transmission is performed by using a DMRS port 7.

Table 1 below is a summary of a transmission mode and a fallback transmission which may be set to a release 10 terminal in the LTE/LTE-A.

TABLE 1

| Downlink transmission | Transmission mode 9 | Fallback transmission |
|---|---|---|
| Normal Subframe | Downlink transmission using ranks 1 to 8 based on DMRS | SFBC downlink transmission based on the CRS |
| MBSFN Subframe | Downlink transmission using ranks 1 to 8 based on DMRS | Downlink transmission using port 7 based on the DMRS |

The transmission mode of the LTE/LTE-A terminal is set according to a determination of the base station. But, the fallback transmission is not set by the base station, and is always performed as noted table 1 above.

In the LTE/LTE-A system, when the fallback is transmitted based on the DMRS, the DMRS is scrambled for interference randomization. A sequence for the DMRS scrambling may be different depending on which initial state is used in a sequence generator, and the initial state is defined as noted in Equation 1 below.

$$c_{init}=(\lfloor n_s/2 \rfloor+1)\cdot(2N_{ID}^{cell}+1)\cdot 2^{16}+n_{SCID} \qquad \text{Equation 1}$$

In Equation 1 above, ns is a slot ID indicating nth slot in the radio frame. In a case of the LTE/LTE-A system, one subframe includes two slots. In addition, $2N_{ID}^{cell}$ is a cell ID included in each cell, has values of 0 to 503, and is information obtained by receiving the CRS of a corresponding cell when the terminal accesses to the cell initially or performs a handover. $n_{SCID}$ $n_{SCID}$ is an ID of the scrambling sequence, and is fixed as zero in a case of the DMRS for the fallback transmission.

In the LTE/LTE-A system, when the fallback transmission is performed to the terminal, the base station transfers control information by using a Physical Downlink Control Channel in order to inform of fallback transmission to the terminal. The control information transmitted with the PDCCH for the fallback transmission is transmitted in a form according to a Downlink Control Information (DCI) format 1A. The PDCCH is a channel transmitted based on the CRS.

SUMMARY

Technical Problem

The objective to be resolved by the present invention is to provide a method and an apparatus for effectively utilizing a wireless resource when a fallback transmission is performed in a distributed antenna system based on an LTE-A system.

Technical Solution

According to an embodiment of the present invention, α terminal apparatus for receiving data from a base station in a wireless communication system includes a receiver that receives control information and a downlink data, a de-multiplexer that de-multiplexes a signal received from the receiver, a decoder that decodes the de-multiplexed signal, and a controller that controls to confirm a kind of a subframe in which the downlink data is transmitted, when the subframe is a normal subframe, receive the downlink data based on a Cell specific Reference Signal (CRS) or a DeModulation Reference Signal (DMRS), and when the subframe is a Multimedia Broadcast multicast service Single Frequency Network (MBSFN) subframe, receive the downlink data based on the DMRS.

In addition, according to an embodiment of the present invention, a method of receiving data by a terminal from a base station in a wireless communication system includes receiving control information with respect to a downlink data transmission, confirming a kind of a subframe in which the downlink data is transmitted, receiving the downlink data based on a Cell specific Reference Signal (CRS) or a DeModulation Reference Signal (DMRS), when the subframe is a normal subframe, and receiving the downlink data based, on the DMRS, when the subframe is a Multimedia Broadcast multicast service Single Frequency Network (MBSFN) subframe.

In addition, according to an embodiment of the present invention, a base station apparatus for transmitting data to a terminal in a wireless communication system includes a first signal generator that generates a Physical Downlink Control CHannel (PDCCH) or an Enhanced-PDCCH (E-PDCCH) signal, a second signal generator that generates a Physical Downlink Shared CHannel (PDSCH) signal, a multiplexer that multiplexes the signals generated from the first and second signal generators, a transmitter that transmits multiplexed downlink data to the terminal, and a controller that controls the first signal generator, the second signal generator and the multiplexer in order to confirm a kind of a subframe in which the downlink data is transmitted, when the subframe is a normal subframe, transmit the downlink data based on a Cell specific Reference Signal (CRS) or a DeModulation Reference Signal (DMRS), and when the subframe is a Multimedia Broadcast multicast service Single Frequency Network (MBSFN) subframe, transmit the downlink data based on the DMRS.

In addition, according to an embodiment of the present invention, a method of transmitting data from a base station to a terminal in a wireless communication system includes determining a terminal for transmitting downlink data, confirming a kind of a subframe in which the downlink data is transmitted, transmitting the downlink data based on a Cell specific Reference Signal (CRS) or a DeModulation Reference Signal (DMRS), when the subframe is a normal subframe, and transmitting the downlink data based on the DMRS, when the subframe is a Multimedia Broadcast multicast service Single Frequency Network (MBSFN) subframe.

Advantageous Effects

According to the present invention, when a fallback transmission is performed in a normal subframe, the fallback transmission is performed based on a CRS or a DMRS depending on a circumstance, and therefore, a proper transmission may be performed for various wireless environments in a distributed antenna system.

In addition, according to the present invention, a scrambling sequence of a DMRS used for a fallback transmission in a distributed antenna system is applied differently according to each of positions of antennas or applied differently according to each terminal, and therefore, interference occurring when distributed antennas transmit different signals may be randomized.

In addition, according to the present invention, when an ACK/NACK signal for a fallback transmission is transmitted, uplink power may be properly adjusted depending on a channel condition.

Further, according to the present invention, when a fallback transmission is performed base on a DMRS, a diversity transmission method is applied, and therefore, a stable reception performance may be secured in a rapidly changing wireless channel circumstance.

DETAILED DESCRIPTION

Figure 1:
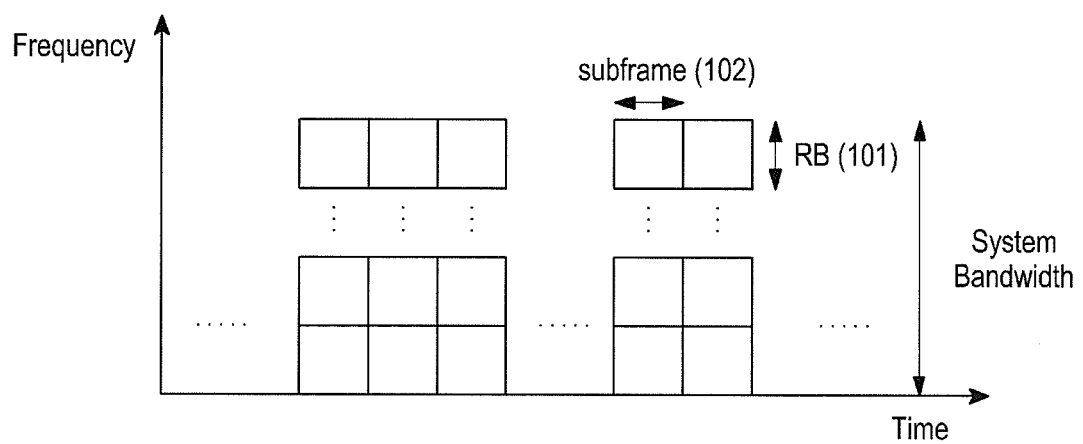
FIG. 1 illustrates a time-frequency resource in an LTE/LTE-A system.
Figure 2:
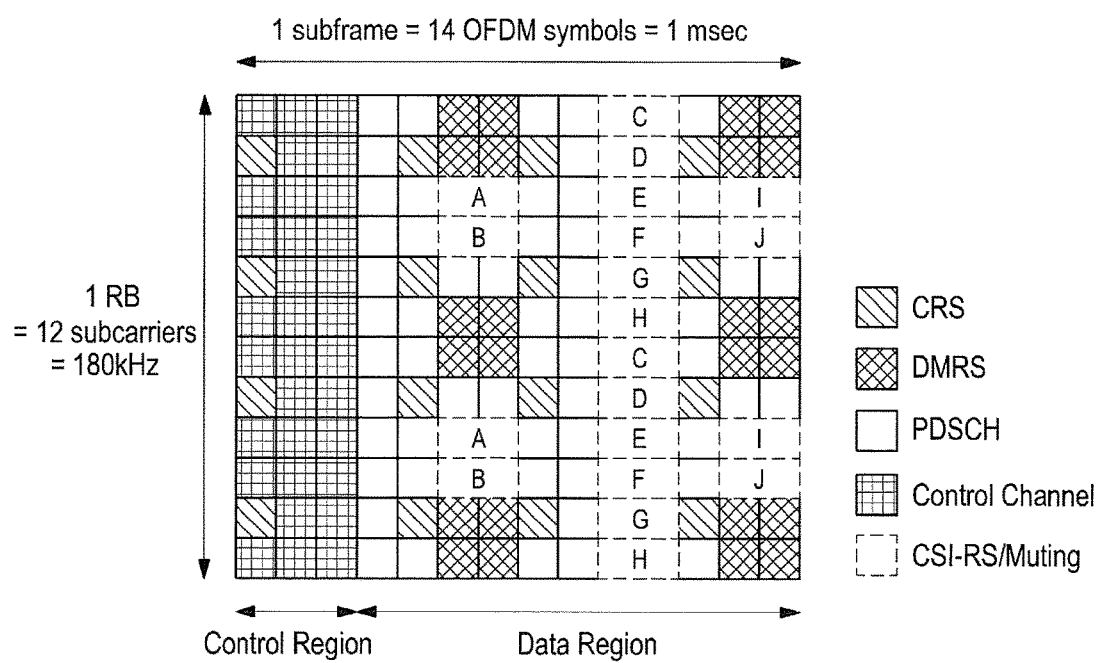
FIG. 2 illustrates a wireless resource of one subframe and one RB, which is a minimum unit schedulable in a downlink in the LTE/LTE-A system.
Figure 3:
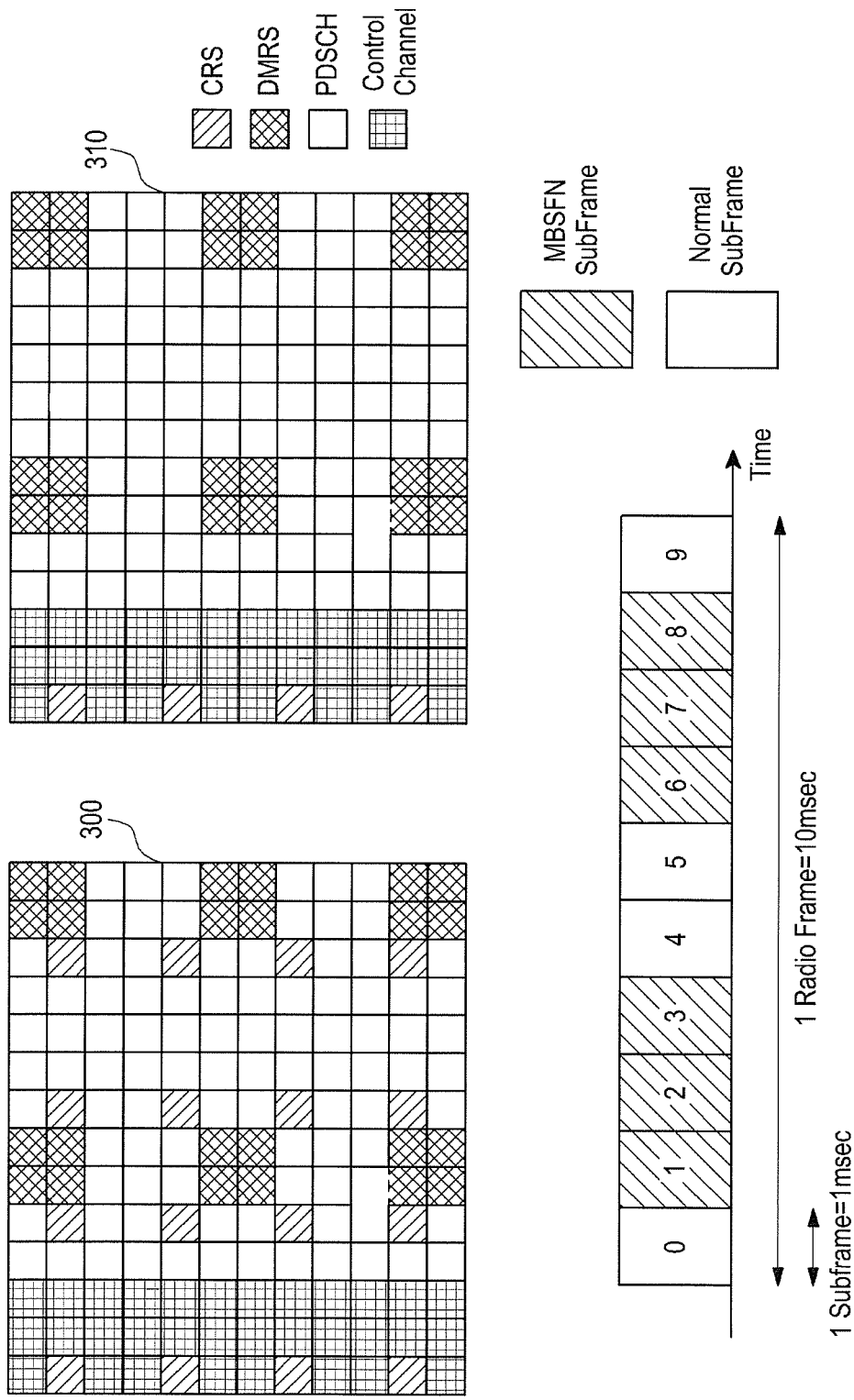
FIG. 3 illustrates a signal transmitted according to a time in the LTE/LTE-A system.
Figure 4:
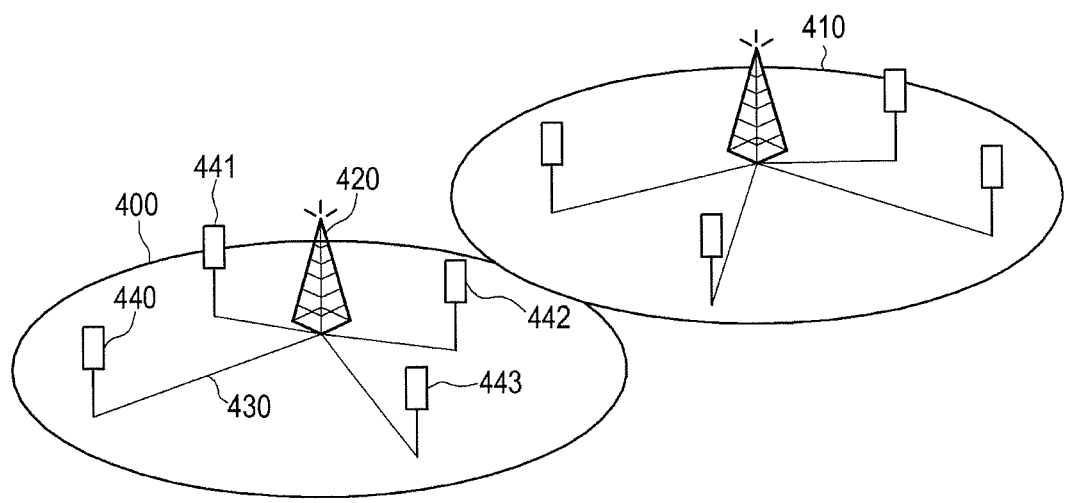
FIG. 4 illustrates an example of a distributed disposition of antennas in a normal distributed antenna system.
Figure 5:
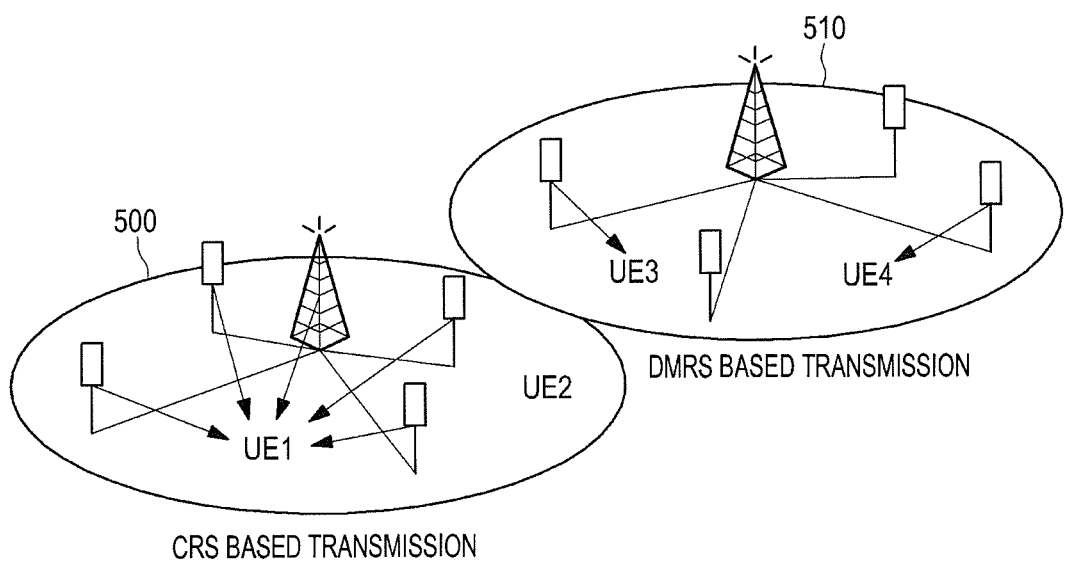
FIG. 5 illustrates transmitting a data signal based on a CRS and transmitting the data signal based on a DMRS in a distributed antenna system.

Hereinafter, an embodiment of the present invention will be described in detail with reference to the accompanying drawings. In the following description of the present invention, a detailed description of known functions or configurations incorporated herein will be omitted when it may make the subject matter of the present invention rather unclear. The terms which will be described below are terms defined in consideration of the functions in the present disclosure, and may be different according to users, intentions of the users, or customs. Therefore, the definitions of the terms should be determined based on the contents throughout the specification.

Hereinafter, in the present specification, embodiments of the present invention will be described based on a fallback transmission, but the present invention is not limited thereto, and may be applied to a general data transmission.

Further, the detailed description of embodiments of the present invention is made mainly based on a wireless communication system based on OFDM, particularly 3GPP EUTRA standard, but the subject matter of the present invention can be applied to other communication systems having a similar technical background and channel form after a little modification without departing from the scope of the present invention and the above can be determined by those skilled in the art.

In the existing LTE/LTE-A system, when the fallback transmission is performed, as described above, the fallback transmission is performed based on the CRS or the DMRS according to whether the subframe in which the fallback transmission is performed is the normal subframe or the MBSFN subframe. That is, as noted in Table 1, although the transmission mode is based on the DMRS, the fallback transmission in the normal subframe is always performed based on the CRS. As described above, when the fallback transmission is always performed with a downlink transmission based on the CRS in the normal subframe, in the above-mentioned distributed antenna system, transmission resources of all antennas included in one cell should be assigned for a terminal receiving the fallback transmission. As described above, this has an advantage of increasing a reception performance, but may incur inefficiency of a wireless resource assignment.

In addition, in the LTE/LTE-A system, when an eNB performs the fallback transmission based on the DMRS, the DMRS is scrambled by using a scrambling sequence determined according to a cell ID, as noted equation 1 above. Such a scrambling method may be a factor incurring a performance decline when the fallback transmission is performed based on the DMRS in the distributed antenna system. In a case of the distributed antenna system, antennas are disposed at a plurality of different positions in a cell, an initial state in which a scrambling of the DMRS is determined according to a cell ID is used when the fallback transmission is performed. In a case wherein such a scrambling is performed, when the different antennas of the distributed antenna system perform the fallback transmission on the different terminal, respectively, by using the DMRS, the different antennas use the same initial state. When the same initial state is used, the same scrambling sequence is generated and interferences of signals transmitted from different positions cannot be randomized, thereby, incurring performance decline. In the distributed antenna system, the performance decline due to interference becomes worse, because a DMRS port 7 is always used when the fallback transmission using the DMRS is performed. But, when the fallback transmission is performed by using different DMRS ports in different transmission points, an interference effect caused by DMRS may be avoided.

Therefore, the present invention proposes a fallback transmission method for minimizing the performance decline due to the interference in the distributed antenna system.

First Embodiment

In the case of the fallback transmission in the normal subframe, when the base station selects one of the CRS and the DMRS, rather than the base station always transmits data based on the CRS, the base station may perform the fallback transmission by properly using the CRS or the DMRS according to circumstances. That is, when it is importance to secure a reception performance of a terminal receiving the fallback transmission, the fallback transmission, based on the CRS, which transmits data to only a specific terminal, is performed. When it is important to transmit data from different antennas in a cell to different terminals, the fallback transmission, based on the DMRS, which may transmit data to a plurality of terminals, is performed. As described above, in order for the base station to perform the fallback transmission by selecting one of the fallback transmission based on the CRS and the fallback transmission based on the DMRS in the normal subframe, a function of informing of the selection should be supported.

In a first embodiment of the present invention, as a method of informing of which of the fallback transmission based on the CRS or the fallback transmission based on the DMRS is transmitted in the normal subframe, from the base station to the terminal, the following three methods are proposed.

<Method 1>

In method 1, when a channel informing of the performance of the fallback transmission is the PDCCH, it is informed that the fallback transmission is performed based on the CRS. When the channel informing of the performance of the fallback transmission is an Enhanced-PDCCH (E-PDCCH), it is informed that the fallback transmission is performed based on the DMRS. As described above, the base station transmits and informs of the performance of the fallback transmission to the terminal by using the DCI format 1A. The DCI format 1A is transmitted by using the PDCCH or the E-PDCCH, the PDCCH is a control channel transmitted based on the CRS, and the E-PDCCH is a control channel transmitted based on the DMRS. When the DCI format 1A informing of the fallback transmission in the normal subframe is transmitted by using the PDCCH, the terminal assumes that the fallback transmission is performed based on the CRS. In addition, when the DCI format 1A informing of the fallback transmission in the normal subframe is transmitted by using the E-PDCCH, the terminal assumes that the fallback transmission is performed based on the DMRS.

A method of informing of whether the fallback transmission is performed to the terminal based on the CRS or based on the DMRS by using the transmission of the DCI format 1A by either the PDCCH or the E-PDCCH as described in the method 1, does not have to transmit additional control information.

<Method 2>

In method 2, a fallback transmission type bit, which is one bit of control information for informing of a fallback transmission manner, is added to the DCI format 1A, which is a control information type informing of the performance of the fallback transmission. When the fallback transmission type bit, in the DCI format 1A informing of the fallback transmission in the normal subframe, is 0, the terminal assumes that the fallback transmission is performed based on the CRS. In addition, when the fallback transmission type bit, in the DCI format 1A informing of the fallback transmission in the normal subframe, is 1, the terminal assumes that the fallback transmission is performed based on the DMRS.

As described above, in the method 2, the fallback transmission type bit is added in the DCI format 1A, and therefore, whether the fallback transmission is performed based on the CRS or is performed based on the DMRS is informed of, regardless of the channel (PDCCH or E-PDCCH) transmitting the DCI format 1A. Such a method needs an additional one bit of control information, but enables the base station to freely determine regardless of transmitting the PDCCH or the E-PDCCH.

Figure 6:
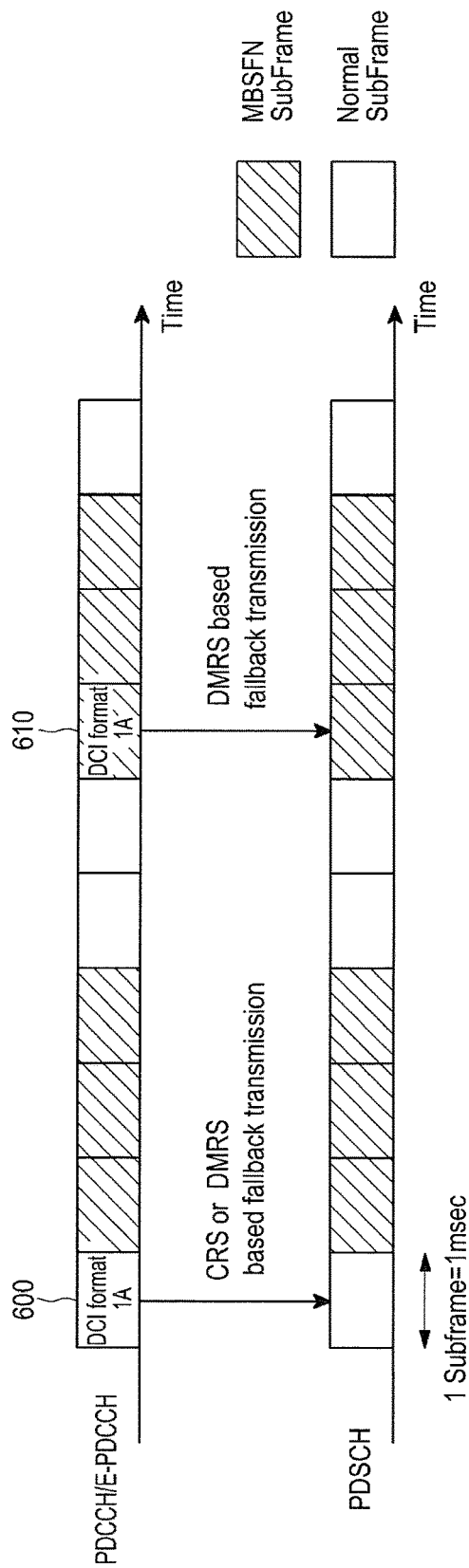
FIG. 6 illustrates informing of whether a fallback transmission is based on the CRS or the DMRS in a normal subframe according an embodiment of the present invention.

FIG. 6 illustrates informing of the fallback transmission manner to the terminal by using the method 1 and the method 2 according to the first embodiment of the present invention.

In the LTE/LTE-A system, the PDCCH or the E-PDCCH is transmitted together with the PDSCH, as shown in FIG. 6. At this time, the PDCCH or the E-PDCCH performs a function of informing of the control information, for receiving the PDSCH which is a data channel, to the terminal. In a subframe 600, the PDCCH or the E-PDCCH is transmitted together with the PDSCH. According to the method 1, when the base station informs that the fallback transmission is performed based on the CRS to the terminal, the DCI format 1A is transmitted with the PDCCH. When the base station informs that the fallback transmission is performed based on the DMRS to the terminal, the DCI format 1A is transmitted with the E-PDCCH. In addition, according to the method 2, when the base station informs that the fallback transmission is performed based on the CRS to the terminal, the base station sets the fallback transmission type bit as '0' and transmits the fallback transmission type bit with the PDCCH or the E-PDCCH. When the base station informs that the fallback transmission is performed based on the DMRS to the terminal, the base station sets the fallback transmission type bit as '1' and transmits the fallback transmission type bit with the PDCCH or the E-PDCCH.

The base station performs the fallback transmission based on the CRS or the DMRS according to the method 1 or the method 2 in the normal subframe such as 600 in FIG. 6. However, the base station performs the fallback transmission by always using the DMRS in the MBSFN subframe such as 610 in FIG. 6.

<Method 3>

In addition to informing of whether the fallback transmission is performed based on the CRS or is performed based on the DMRS by using the PDCCH or the E-PDCCH as described in method 1 and the method 2, a method of setting, whether the fallback transmission is performed based on the CRS or is performed based on the DMRS in the normal subframe, by using a higher layer signaling is possible, as a method 3.

Second Embodiment

As described in table 1, the downlink transmission includes a transmission determined by the fallback transmission and a transmission mode. In a transmission mode such as a transmission mode 9 of Table 1, the control information transmitted together with data includes information indicating which DMRS port is used and which initial state is used among initial states of a plurality of DMRS scrambling sequences. In contrast, in the case of the fallback transmission, the control information does not include the information indicating which DMRS port is used and which initial state is used among the initial states of the plurality of DMRS scrambling sequences. Therefore, in the LTE/LTE-A release 10, when the fallback transmission is performed, a DMRS port 7 and an initial state, of a DMRS scrambling sequence, which is always constant, are used.

As described above, when the fallback transmission is performed by using the DMRS, the DMRS is scrambled with a sequence generated by an initial state using a function of the cell ID such as equation 1. In the distributed antenna system, as described above, in a case wherein the DMRS is scrambled with a sequence different according to the cell ID, interference occurring when the distributed antennas transmit different signals is not randomized, and therefore reception performance is declined. In order to prevent such a problem, in the distributed antenna system, the scrambling sequence of the DMRS used in the fallback transmission should be applied differently to each of positions of the distributed antennas or should be applied differently to each terminal.

Therefore, in the second embodiment of the present invention, the following three methods are proposed, as a method of determining the DMRS port and the initial state of the DMRS scrambling sequence used in the fallback transmission.

<Method 1>

In the distributed antenna system, when the fallback transmission is performed based on the DMRS, the DMRS port and the initial state for the scrambling sequence of the DMRS are informed of to the terminal by using the higher layer signaling. Setting the initial state by using the higher layer signaling as described above, does not need the transferring of the control information by using the additional PDCCH or the E-PDCCH. In addition, when the fallback transmission is performed, one of the plurality of initial states determined by the transmission mode is designated as the initial state for the scrambling sequence of the DMRS, and therefore, an overhead of the higher layer signaling may be decreased.

Table 2 below is one example wherein the initial state for the DMRS scrambling sequence is set by using the higher layer signaling when the fallback transmission is performed according to the method 1 of the second embodiment of the present invention.

TABLE 2

| Downlink transmission | Transmission by set transmission mode | Fallback transmission in normal subframe | Fallback transmission in MBSFN subframe |
|---|---|---|---|
| Initial state for DMRS scrambling sequence | Initial state A Initial state B Initial state C | Initial state A | Initial state B |
| BDMRS Port | Port 7~Port 14 | Port 7 | Port 8 |

As noted in Table 2 above, when the method 1 is applied, the DMRS port and the initial state for the DMRS scrambling sequence used in the fallback transmission in the normal subframe and the MBSFN subframe of the terminal may be individually set by using the higher layer signaling. The reason why the initial states are individually set in the normal subframe and the MBSFN subframe, as noted in table 2 above, is for expanding a range of choices of the scrambling sequence when the fallback transmission is performed by using two different initial states. That is, in Table 2 above, an initial state A may be useful in effectively controlling or randomizing interference when the fallback transmission is performed from a plurality of transmission points in the distributed antenna system. An initial state B may be useful in effectively controlling or randomizing interference when the fallback transmission is performed from one transmission point in the distributed antenna system. When the initial states are individually set with respect to the normal subframe and the MBSFN subframe as noted in Table 2 above, the base station may perform the fallback transmission in correspondence to circumstances. In addition, the DMRS port for the normal subframe and the DMRS port for the MBSFN subframe are individually set, and therefore, a MU-MIMO which simultaneously transmits a signal to a plurality of terminals in the distributed antenna system may be effectively supported. For example, when one terminal performs the fallback transmission by using a DMRS port 7 and another terminal performs the fallback transmission by using a DMRS port 8 in the MBSFN subframe, orthogonality of the DMRS port 7 and the DMRS port 8 is maintained, and therefore, an improvement effect of a channel estimation and the like may be obtained. The higher layer signaling is performed by using a UE specific signaling individually transmitted to each terminal.

<Method 2>

In the method 1 according to the second embodiment of the present invention, the initial state for the DMRS scrambling sequence in time of the fallback transmission is individually set in the normal subframe and the MBSFN subframe by using the higher layer signaling. Because the higher layer signaling is used for setting the initial state for the fallback transmission in the method 1 as described above, finally, a overhead is incurred. Therefore, in method 2, in order to prevent such a higher layer signaling overhead, one of a plurality of initial states determined by the transmission mode is selected and used with a predetermined method. That is, as noted table 2 above, when the initial state A, the initial state B and the initial state C are set, each one of among the initial state A, the initial state B and the initial state C is designated and used as the initial state for the DMRS scrambling sequence in the normal subframe and the MBSFN subframe. In a method of selecting one of the plurality of initial states without additional signaling, a firstly set initial state may be always used in consideration of a sequence of the initial states. In addition, a minimum value or a maximum value among values of the initial states may be used. In addition, a modulo operation is performed on a Radio Network Temporary Identifier (RNTI) which is a unique ID of the terminal by a total number of selectable initial states, and an initial state corresponding to a value obtained by the modulo calculation may be used.

In addition, in the method 2, one of a plurality of DMRS ports which may be supported by the base station is selected and used with a predetermined method as the DMRS port used in the fallback transmission, without additional higher layer signaling. The method of selecting one of the DMRS ports includes a method of using the RNTI which is the unique ID of the terminal. For example, when the DMRS ports used for the fallback transmission are two kinds of the DMRS port 7 and the DMRS port 8, a modulo operation is performed on an RNTI value by 2, when a result of the modulo operation is 0, the port 7 is used, and when the result of the modulo operation is 1, the port 8 is used. As another method, the modulo operation is performed on one among cell IDs of the CSI-RSs measured by the terminal by 2, and one of the DMRS port 7 or the DMRS port 8 may be selected according to a result of the modulo operation.

<Method 3>

In the method 1 according to the second embodiment of the present invention, the initial state and the DMRS port for the DMRS scrambling sequence in time of the fallback transmission are individually set in the normal subframe and the MBSFN subframe by using the higher layer signaling. In addition, in the method 2, the initial state and the DMRS port for the DMRS scrambling sequence in time of the fallback transmission are individually set according to the predetermined method in the normal subframe and the MBSFN subframe, without additional higher layer signaling. Besides such the method 1 and the method 2, the base station may inform of the two kinds of information to the terminal by using the PDCCH or the E-PDCCH according to method 3.

That is, according to the method 3, the base station inputs the information of the initial state and the DMRS port for the DMRS scrambling sequence to the control information by using the DCI format 1A for the fallback transmission, so as to transmit the information of the initial state and the DMRS port. The terminal receives the control information with respect to the initial state and the DMRS port for the DMRS scrambling sequence included in the DCI format 1A received by using the PDCCH or the E-PDCCH, and obtains information necessary to receive the fallback transmission.

Third Embodiment

In the first and second embodiments of the present invention, in the case that the fallback transmission is performed, which method the base station uses to transmit the fallback transmission and how the terminal receives the fallback transmission were described. In the third embodiment of the present invention, a method of controlling an uplink transmission power when an ACK/NACK is transmitted to the base station is proposed. Here, the ACK/NACK indicates whether the terminal receiving the fallback transmission properly receives the fallback transmission after the base station performs the fallback transmission on a specific terminal.

In general, when the fallback transmission is performed, a wireless channel environment may not be proper for performing a downlink transmission by a transmission mode. When a channel environment of a downlink where a transmission from the base station to the terminal is performed is poor, a channel environment of an uplink where a transmission from the terminal to the base station is performed also becomes poor. In order to resolve such a problem, in the third embodiment of the present invention, a method of properly controlling the uplink transmission power in time of the fallback transmission is proposed.

Table 3 below is summary of the uplink transmission power in time of the fallback transmission proposed in the present invention.

TABLE 3

| Downlink transmission | Transmission by set transmission mode | Fallback transmission in normal subframe | Fallback transmission in MBSFN subframe |
|---|---|---|---|
| Uplink transmission power | Tx Power = Level A | Tx Power = Level A + Δ 1 | Tx Power = Level A + Δ 2 |

In Table 3 above, when the fallback transmission is performed in the downlink, the uplink transmission power of the ACK/NACK signal with respect to the fallback transmission is set differently according to whether the fallback transmission is performed in the normal subframe or is performed in the MBSFN subframe. In addition, the uplink transmission power of the ACK/NACK signal may be determined as a comparative value of a specific uplink transmission power. In Table 3 above, a standard uplink transmission power uses an uplink transmission power (Level A) which is applied when the transmission by the set transmission mode is performed.

Table 3 above specifies an example of setting the uplink transmission power of the ACK/NACK with respect to the fallback transmission based on the specific uplink transmission power. However, besides such a method, it is also possible to set the transmission power of the ACK/NACK with respect to the fallback transmission as an absolute value. In this case, when the fallback transmission is performed, the terminal transmits the ACK/NACK with a predetermined uplink transmission power. At this time, the uplink transmission power of the ACK/NACK with respect to the fallback transmission is set by an informing from the base station to the terminal with the higher layer signaling.

Another method besides the method noted in table 3 above, includes a method of setting the uplink transmission power of the ACK/NACK with respect to the fallback transmission differently according to whether the base station performs the fallback transmission based on the CRS or performs the fallback transmission based on the DMRS. Furthermore, when the fallback transmission is performed based on the DMRS, the uplink transmission power of the ACK/NACK with respect to the fallback transmission may be set differently according to which initial state for a scrambling sequence is used.

Fourth Embodiment

In the fourth embodiment of the present invention, a diversity transmission method based on the DMRS is proposed as another method of improving the fallback transmission. In a case of an existing LTE/LTE-A system, a transmission diversity such as a Space Frequency Block Code (SFBC) is used, for a diversity transmission. The transmission diversity of such an existing LTE/LTE-A system is based on the CRS. In the case of the fallback transmission based on the DMRS, the fallback transmission is performed by using a beam forming of which a rank is 1. But, in general, the beam forming provides poor reception performance compared to the transmission diversity in a rapidly changing wireless channel environment.

In order to secure a performance of a level identical to the transmission diversity, it is necessary to obtain a diversity within one RB. In addition, such a transmission method should be based on the DMRS rather than the CRS. The diversity transmission method based on the DMRS proposed in the fourth embodiment of the present invention performs the fallback transmission by using a plurality of DMRS ports, assigns REs transmitted with the fallback transmission in the one RB to the plurality of DMRS ports, respectively, and transmits the REs assigned to a specific DMRS port in one RB with a precoding identical to that of a corresponding DMRS port.

Figure 7:
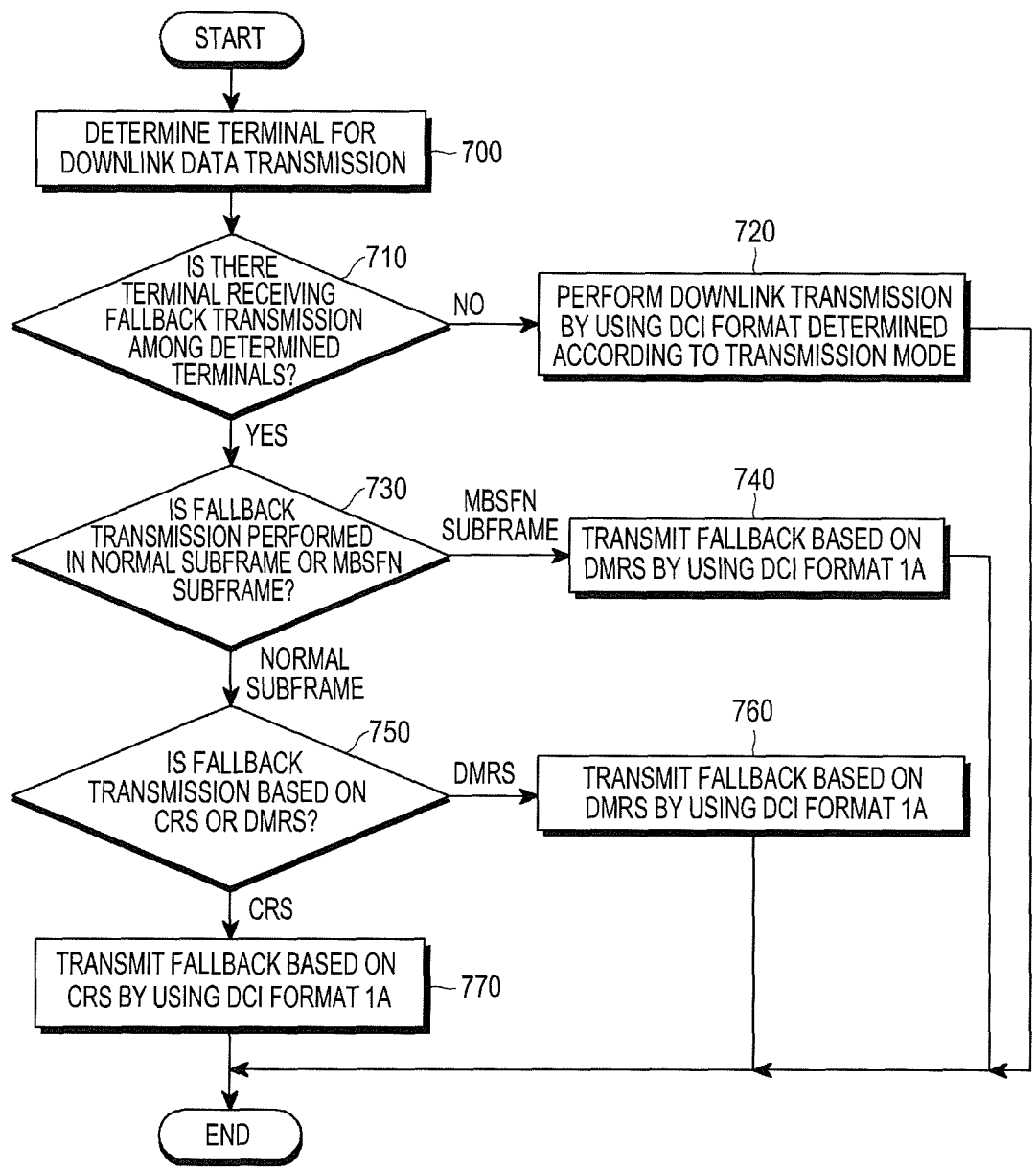
FIG. 7 is a flowchart illustrating an operation of a base station performing the fallback transmission in the distributed antenna system according to an embodiment of the present invention.

FIG. 7 is a flowchart illustrating an operation of the base station performing the fallback transmission in the distributed antenna system according to an embodiment of the present invention.

In FIG. 7, the base station performs a scheduling for determining a terminal for the downlink data transmission in step 700. After the base station determines the terminal for the downlink data transmission in step 700, the base station determines whether there is a terminal receiving the downlink data with the fallback transmission among terminals receiving the downlink data in step 710. When it is determined that there is not a terminal receiving the downlink data with the fallback transmission in step 710, the downlink transmission is performed by using the DCI format determined according to the set transmission mode rather than the DCI format 1A in step 720. In contrast, when it is determined that there is the terminal receiving the downlink data with the fallback transmission in step 710, the base station determines whether the fallback transmission is performed in the MBSFN frame or is performed in the normal subframe in step 730. When it is determined that the fallback transmission is performed in the MBSFN subframe in step 730, the base station performs the fallback transmission based on the DMRS on the terminal in step 740. In addition, the base station transmits the DCI format 1A to the terminal to inform that the fallback transmission is performed based on the DMRS. At this time, the base station informs the initial state for the DMRS scrambling and the control information including the uplink transmission power of the ACK/NACK with respect to the fallback transmission to the terminal, according to the second or third embodiment of the present invention. In addition, the fallback transmission based on the DMRS may be performed according to the fourth embodiment of the present invention.

When it is determined that the fallback transmission is performed in the normal subframe in step 730, the base station determines whether the base station performs the fallback transmission based on the CRS or performs the fallback transmission based on the DMRS in step 750. When it is determined that the fallback transmission is performed based on the DMRS in step 750, the base station performs the fallback transmission based on the DMRS and informs that the fallback transmission is performed based on the DMRS to the terminal. In addition, the base station informs of the initial state for the DMRS scrambling and the control information including the uplink transmission power of the ACK/NACK with respect to the fallback transmission to the terminal, according to the second or third embodiment of the present invention. In addition, the fallback transmission based on the DMRS may be performed according to the fourth embodiment of the present invention.

When it is determined that the fallback transmission is performed based on the CRS in step 750, the base station performs the fallback transmission based on the CRS and informs that the fallback transmission is performed based on the CRS to the terminal. In addition, the base station determines the uplink transmission power of the ACK/NACK with respect to the fallback transmission to the terminal, according to the third embodiment of the present invention.

Figure 8:
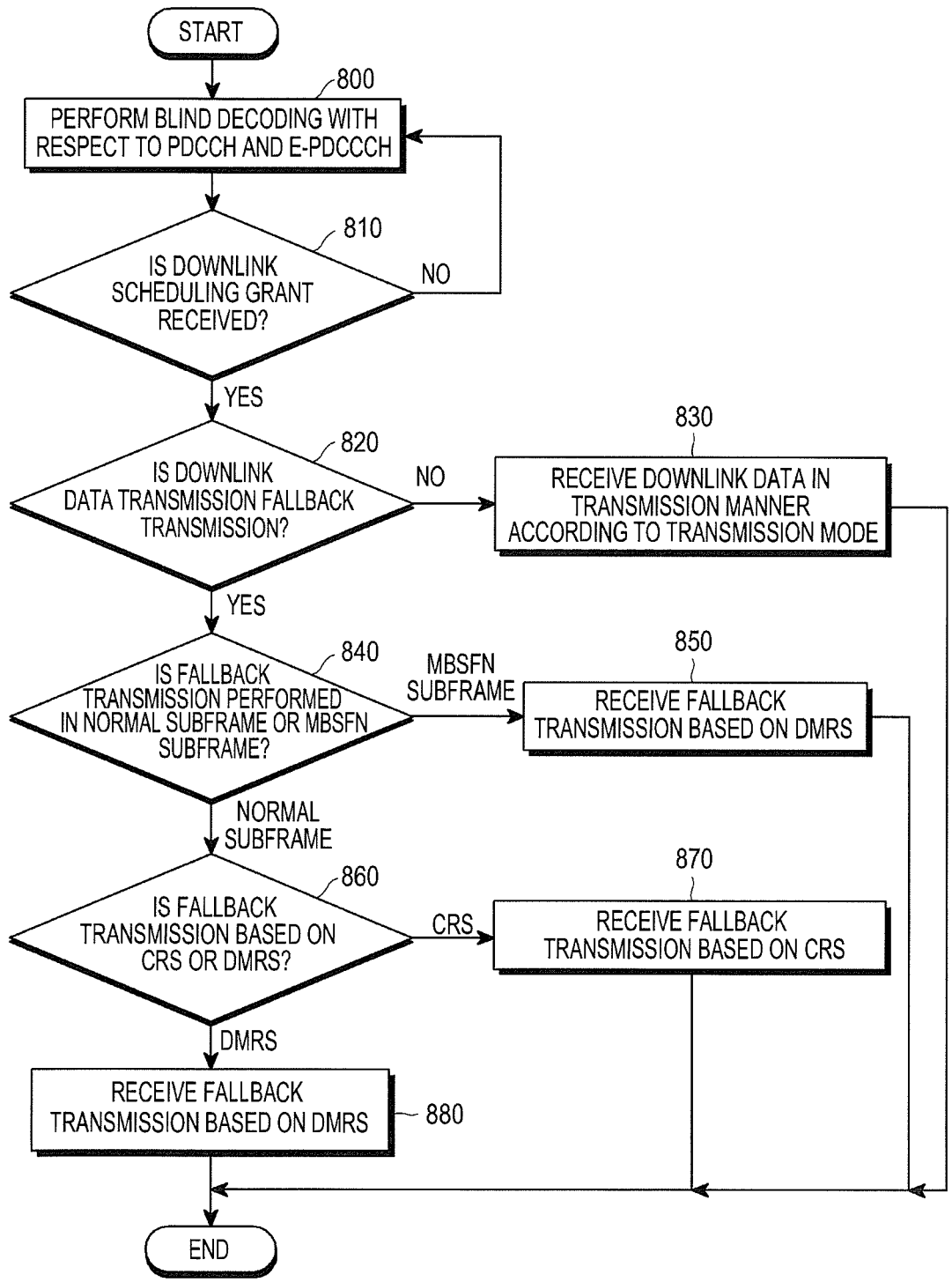
FIG. 8 is a flowchart illustrating an operation of a terminal performing the fallback transmission in the distributed antenna system according to an embodiment of the present invention.

FIG. 8 is a flowchart illustrating an operation of the terminal performing the fallback transmission in the distributed antenna system according to an embodiment of the present invention.

The terminal performs a blind decoding with respect to the PDCCH/E-PDCCH in step 800 of FIG. 8. Next, the terminal determines whether the terminal receives a downlink scheduling grant based on a result of the blind decoding with respect to the PDCCH/E-PDCCH of step 800, in step 810. When it is determined that the downlink scheduling grant is not received in step 810, the terminal performs the blind decoding again in the next subframe. In contrast, when it is determined that the downlink scheduling grant is received in step 810, the terminal determines whether a corresponding downlink data transmission is the fallback transmission in step 820. It is determined whether the downlink data transmission is the fallback transmission in step 820 according to whether the DCI format transferred to the terminal by using the PDCCH/E-PDCCH is the DCI format 1A or not. When it is determined that the downlink data transmission is not the fallback transmission in step 820, the terminal receives the downlink transmission from the base station according to the transmission manner defined by the transmission mode in step 830.

When it is determined that the fallback transmission is received in step 820, the terminal performs operations which are different according to whether the subframe where the fallback transmission is received is the MBSFN subframe or the normal subframe. That is, when the subframe is the MBSFB subframe, the terminal receives the fallback transmission based on the DMRS in step 850. At this time, the terminal determines an initial state for a DMRS de-scrambling and the uplink transmission power of the ACK/NACK with respect to the fallback transmission, according to the second or the third embodiment of the present invention. In addition, the fallback transmission based on the DMRS may be performed according to the fourth embodiment of the present invention.

In addition, when a corresponding subframe is the normal subframe, the terminal determines whether the fallback transmission is performed based on the DMRS or the CRS in step 860. Such a determination is performed according to the first embodiment of the present invention.

When it is determined that the fallback transmission is based on the CRS as a result of step 860, the terminal receives the fallback transmission based on the CRS in step 870, and the uplink transmission power of the ACK/NACK with respect to the fallback transmission is determined according to the third embodiment of the present invention. In contrast, when it is determined that the fallback transmission is based on the DMRS, the terminal receives the fallback transmission based on the DMRS in step 880. At this time, the terminal determines the initial state for the DMRS de-scrambling and the uplink transmission power of the ACK/NACK with respect to the fallback transmission, according to the second or the third embodiment of the present invention. In addition, the fallback transmission based on the DMRS may be performed according to the fourth embodiment of the present invention.

Figure 9:
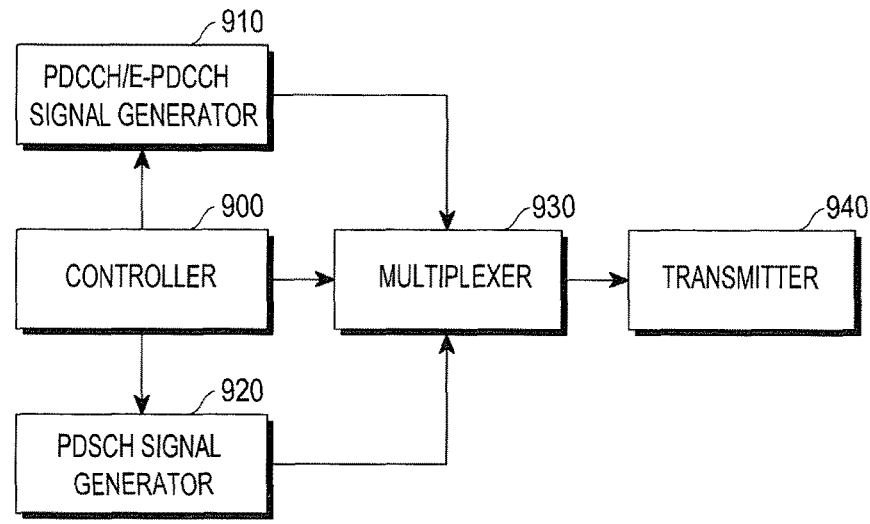
FIG. 9 illustrates an apparatus configuration of the base station performing the fallback transmission in the distributed antenna system according to an embodiment of the present invention.

FIG. 9 illustrates an apparatus configuration of the base station according to an embodiment of the present invention.

In FIG. 9, the base station includes a controller 900, a PDCCH/E-PDCCH signal generator 910, a PDSCH signal generator 920, a multiplexer 930 and an OFDMA transmitter 940. The controller 900 determines the downlink scheduling. In addition, the controller 900 determines whether the fallback transmission is performed or not. In addition, the controller 900 determines whether the fallback transmission is based on the DMRS or the CRS. When the determination is performed, the controller 900 controls the PDCCH/E-PDCCH signal generator 910 and the PDSCH signal generator 920 so that the PDCCH/E-PDCCH signal generator 910 and the PDSCH signal generator 920 generate signals in correspondence to the determination. The signals generated from the PDCCH/E-PDCCH signal generator 910 and the PDSCH signal generator 920 are multiplexed in the multiplexer 930 and transmitted through the OFDMA transmitter 940 under a control of the controller 900.

Figure 10:
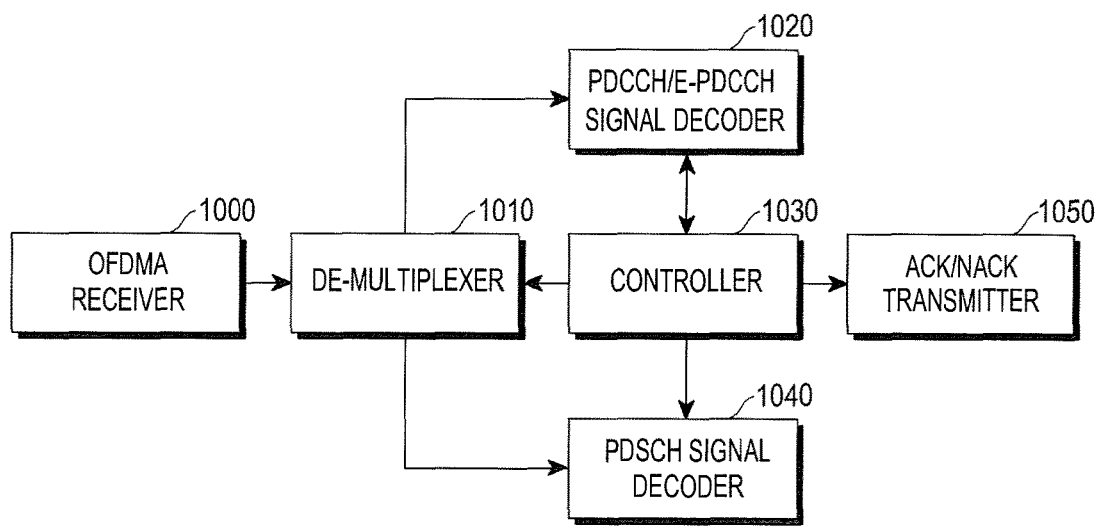
FIG. 10 illustrates an apparatus configuration of the terminal performing the fallback transmission in the distributed antenna system according to an embodiment of the present invention.

FIG. 10 illustrates an apparatus configuration of the terminal according to an embodiment of the present invention.

In FIG. 10, the terminal includes an OFDMA receiver 1000, a de-multiplexer 1010, a PDCCH/E-PDCCH signal decoder 1020, a controller 1030, a PDSCH signal decoder 1040 and a power controller 1050.

The OFDMA receiver 1000 receives a wireless signal transmitted from the base station. The wireless signal received from the OFDMA receiver 1000 is divided into a PDCCH/E-PDCCH signal and a PDSCH signal in the de-multiplexer 1010. The divided PDCCH/E-PDCCH signal and PDSCH signal are input to the PDCCH/E-PDCCH signal decoder 1020 and the PDSCH signal decoder 1040, respectively, to be decoded. In addition, the controller 1030 determines how to receive the fallback transmission in consideration of a transmission of the PDCCH/E-PDCCH, a transmission of the DCI format 1A, a transmission of the MBSFN or the normal subframe, information included in the PDCCH/E-PDCCH, and the like. The controller 1030 informs of a determination result to the PDCCH signal decoder 1020 and the PDSCH signal decoder 1040. In addition, the controller 1030 determines the uplink transmission power of the ACK/NACK with respect to the fallback transmission in consideration of the transmission of the PDCCH/E-PDCCH, the transmission of the DCI format 1A, the transmission of the MBSFN or the normal subframe, the information included in the PDCCH/E-PDCCH, a parameter set by the higher layer signaling, and the like. The controller 1030 informs of a result of the determination to the ACK/NACK transmitter 1050.

The invention claimed is:

1. A terminal apparatus for receiving data from a base station in a wireless communication system, the terminal apparatus comprising:
   a receiver configured to receive downlink control information (DCI) informing of a fallback transmission in a subframe being not a multimedia broadcast multicast service single frequency network (MBSFN) subframe and a downlink data for the fallback transmission,
   wherein the DCI is transmitted using a first channel or a second channel, the first channel is transmitted based on a cell specific reference signal (CRS) and the second channel is transmitted based on a demodulation reference signal (DMRS), and
   the DCI comprises a fallback transmission type bit identifying whether the downlink data for the fallback transmission in the subframe is transmitted based on the CRS or the DMRS;
   a de-multiplexer configured to de-multiplex a signal received from the receiver;
   a decoder configured to decode the de-multiplexed signal received from the de-multiplexer; and
   a controller configured to control the receiver to:
     identify whether a subframe in which the downlink data is transmitted is the MBSFN subframe,
     if the subframe in which the downlink data is transmitted is the MBSFN subframe, receive the downlink data based on the DMRS,
     if the subframe in which the downlink data is transmitted is not the MBSFN subframe and the fallback transmission type bit includes a first value identifying that the downlink data for the fallback transmission in the subframe is transmitted based on the CRS, receive the downlink data based on the CRS, and
     if the subframe in which the downlink data is transmitted is not the MBSFN subframe and the fallback transmission type bit includes a second value identifying that the downlink data for the fallback transmission in the subframe is transmitted based on the DMRS, receive the downlink data based on the DMRS.

2. The terminal apparatus of claim 1, wherein the first channel is a physical downlink control channel (PDCCH) and the second channel is an enhanced-physical downlink control channel (E-PDCCH).

3. The terminal apparatus of claim 2, wherein, if the subframe in which the downlink data is transmitted is not the MBSFN subframe, the decoder is configured to identify that the downlink data is transmitted based on the at least one of the CRS or the DMRS using the fallback transmission type bit included in the DCI transmitted based on a DCI format 1A.

4. The terminal apparatus of claim 2, further comprising:
an ACK/NACK transmitter configured to transmit an ACK/NACK signal with respect to a downlink data transmission to the base station,
wherein the controller is configured to set an uplink transmission power with respect to the ACK/NACK signal based on a kind of a control channel where the DCI is received to inform of the uplink transmission power to the ACK/NACK transmitter.

5. The terminal apparatus of claim 1, wherein, if the subframe in which the downlink data is transmitted is not the MBSFN subframe, the terminal apparatus is informed that the downlink data is transmitted based on the at least one of the CRS or the DMRS from the base station on a higher layer signaling.

6. The terminal apparatus of claim 1, wherein the terminal apparatus is informed of an initial state and a port value of a scrambling sequence with respect to the DMRS from the base station through a higher layer signaling, if the downlink data is received based on the DMRS.

7. The terminal apparatus of claim 1, wherein the terminal apparatus is configured to use an initial state and a port value of a scrambling sequence with respect to the DMRS, the initial state and the port value are predetermined between the base station and the terminal apparatus, if the downlink data is received based on the DMRS.

8. The terminal apparatus of claim 1, wherein the terminal apparatus is informed of an initial state and a port value of a scrambling sequence with respect to the DMRS from the base station by using a DCI format 1A, if the downlink data is received based on the DMRS.

9. The terminal apparatus of claim 1, further comprising:
an ACK/NACK transmitter configured to transmit an ACK/NACK signal with respect to a downlink data transmission to the base station,
wherein the controller is configured to set an uplink transmission power with respect to the ACK/NACK signal based on a kind of the subframe where the downlink data is transmitted to inform of the uplink transmission power to the ACK/NACK transmitter.

10. The terminal apparatus of claim 1, wherein the terminal apparatus is configured to receive the downlink data by using a plurality of DMRS ports, if the downlink data is received based on the DMRS.

11. A method of receiving data by a terminal from a base station in a wireless communication system, the method comprising:
receiving downlink control information (DCI) informing of a fallback transmission in a subframe being not a multimedia broadcast multicast service single frequency network (MBSFN) subframe with respect to a downlink data for the fallback transmission,
wherein the DCI is transmitted using a first channel or a second channel, the first channel is transmitted based on a cell specific reference signal (CRS) and the second channel is transmitted based on a demodulation reference signal (DMRS), and
the DCI comprises a fallback transmission type bit identifying whether the downlink data for the fallback transmission in the subframe is transmitted based on the CRS or the DMRS;
identifying whether a subframe in which downlink data is transmitted is the MBSFN subframe;
receiving the downlink data based on the DMRS, if the subframe in which the downlink data is transmitted is the MBSFN subframe; and
receiving the downlink data based on the CRS, if the subframe in which the downlink data is transmitted is not the MBSFN subframe and the fallback transmission type bit includes a first value identifying that the downlink data for the fallback transmission in the subframe is transmitted based on the CRS; and
receiving the downlink data based on the DMRS, if the subframe in which the downlink data is transmitted is not the MBSFN subframe and the fallback transmission type bit includes a second value identifying that the downlink data for the fallback transmission in the subframe is transmitted based on the DMRS.

12. The method of claim 11, wherein the first channel is a physical downlink control channel (PDCCH) and the second channel is an enhanced-physical downlink control channel (E-PDCCH).

13. The method of claim 12, further comprising transmitting an ACK/NACK signal with respect to a downlink data transmission to the base station, wherein an uplink transmission power with respect to the ACK/NACK signal is set based on a kind of a control channel where the DCI is received to inform of the uplink transmission power to transmit the ACK/NACK signal.

14. The method of claim 11, further comprising:
if the subframe in which the downlink data is transmitted is not the MBSFN subframe, confirming that the downlink data is transmitted based on the at least one of the CRS or the DMRS using the fallback transmission type bit included in the DCI transmitted based on a DCI format 1A.

15. The method of claim 11, further comprising,
if the subframe in which the downlink data is transmitted is not the MBSFN subframe, informing that the downlink data is transmitted based on the at least one of the CRS or the DMRS from the base station through a higher layer signaling.

16. The method of claim 11, wherein an initial state and a port value of a scrambling sequence with respect to the DMRS are informed of from the base station through a higher layer signaling, if the downlink data is received based on the DMRS.

17. The method of claim 11, wherein an initial state and a port value of a scrambling sequence with respect to the DMRS are used, if the downlink data is received based on the DMRS, and the initial state and the port value are predetermined between the base station and the terminal.

18. The method of claim 11, wherein an initial state and a port value of a scrambling sequence with respect to the DMRS are informed of from the base station by using a DCI format 1A, if the downlink data is received based on the DMRS.

19. The method of claim 11, further comprising transmitting an ACK/NACK signal with respect to a downlink data transmission to the base station, wherein an uplink transmission power with respect to the ACK/NACK signal is set based on a kind of the subframe where the downlink data is transmitted.

20. The method of claim 11, wherein the downlink data is received by using a plurality of DMRS ports, if the downlink data is received based on the DMRS.

21. A base station apparatus for transmitting data to a terminal in a wireless communication system, the base station apparatus comprising:
   a first signal generator configured to generate downlink control information (DCI) informing of a fallback transmission in a subframe being not a multimedia broadcast multicast service single frequency network (MBSFN) subframe,
   wherein the DCI is transmitted using a first channel or a second channel, the first channel is transmitted based on a cell specific reference signal (CRS) and the second channel is transmitted based on a demodulation reference signal (DMRS), and
   the DCI comprises a fallback transmission type bit identifying whether a downlink data for the fallback transmission in the subframe is transmitted based on the CRS or the DMRS;
   a second signal generator configured to generate a physical downlink shared channel (PDSCH) signal;
   a multiplexer configured to multiplex the signals generated from the first and second signal generators;
   a transmitter configured to transmit downlink data received from the multiplexer for the fallback transmission to the terminal; and
   a controller configured to:
      control the first signal generator, the second signal generator and the multiplexer in order to identify whether a subframe in which the downlink data is transmitted is the MBSFN subframe, if the subframe in which the downlink data is transmitted is the MBSFN subframe;
      receive the downlink data based on the DMRS, if the subframe in which the downlink data is transmitted is not the MBSFN subframe and the fallback transmission type bit includes a first value identifying that the downlink data for the fallback transmission in the subframe is transmitted based on the CRS; and
      transmit the downlink data based on the CRS, and if the subframe in which the downlink data is not the MBSFN subframe and the fallback transmission type bit includes a second value identifying that the downlink data for the fallback transmission in the subframe is transmitted based on the DMRS, receive the downlink data based on the DMRS.

22. The base station apparatus of claim 21, wherein the first channel is a physical downlink control channel (PDCCH) and the second channel is an enhanced-physical downlink control channel (E-PDCCH).

23. The base station apparatus of claim 22, further comprising:
   an ACK/NACK receiver configured to receive an ACK/NACK signal with respect to a downlink data transmitted from the terminal, wherein the ACK/NACK receiver is configured to receive the ACK/NACK signal by using a transmission power set based on a kind of a control channel where the DCI is transmitted.

24. The base station apparatus of claim 21, wherein, if the subframe in which the downlink data is transmitted is not the MBSFN subframe, the controller is configured to control to transmit the DCI to the terminal and to inform that the downlink data is transmitted based on the at least one of the CRS or the DMRS to the terminal by setting the fallback transmission type bit included in the DCI transmitted based on a DCI format 1A as a predetermined value.

25. The base station apparatus of claim 21, wherein, if the subframe in which the downlink data is transmitted is not the MBSFN subframe, the controller is configured to control to inform that the downlink data is transmitted based on the at least one of the CRS or the DMRS to the terminal through a higher layer signaling.

26. The base station apparatus of claim 21, wherein the controller is configured to control to inform of an initial state and a port value of a scrambling sequence with respect to the DMRS to the terminal through a higher layer signaling, if the downlink data is transmitted based on the DMRS.

27. The base station apparatus of claim 21, wherein the controller is configured to control to use an initial state and a port value of a scrambling sequence with respect to the DMRS, the initial state and the port value are predetermined between the base station apparatus and the terminal, if the downlink data is transmitted based on the DMRS.

28. The base station apparatus of claim 21, wherein the controller is configured to control to inform of an initial state and a port value of a scrambling sequence with respect to the DMRS to the terminal by using a DCI format 1A, if the downlink data is transmitted based on the DMRS.

29. The base station apparatus of claim 21, further comprising:
   an ACK/NACK receiver configured to receive an ACK/NACK signal with respect to a downlink data transmission from the terminal, wherein the ACK/NACK receiver is configured to receive the ACK/NACK signal by using a transmission power set based on a kind of the subframe where the downlink data is transmitted.

30. The base station apparatus of claim 21, wherein the controller is configured to control to transmit the downlink data by using a plurality of DMRS ports, if the downlink data is transmitted based on the DMRS.

31. A method of transmitting data from a base station to a terminal in a wireless communication system, the method comprising:
   determining a terminal for transmitting downlink data for a fallback transmission;
   transmitting downlink control information (DCI) informing of the fallback transmission in a subframe being not a multimedia broadcast multicast service single frequency network (MBSFN) subframe,
   wherein the DCI is transmitted using a first channel or a second channel, the first channel is transmitted based on a cell specific reference signal (CRS) and the second channel is transmitted based on a demodulation reference signal (DMRS), and
   the DCI comprises a fallback transmission type bit identifying whether the downlink data for the fallback transmission in the subframe is transmitted based on the CRS or the DMRS;
   identifying whether a subframe in which the downlink data is transmitted is the MBSFN subframe;
   transmitting the downlink data based on the DMRS, if the subframe in which the downlink data is transmitted is the MBSFN subframe;
   transmitting the downlink data based on the CRS, if the subframe in which the downlink data is transmitted is not the MBSFN subframe and the fallback transmission type bit includes a first value identifying that the downlink data for the fallback transmission in the subframe is transmitted based on the CRS; and transmitting the downlink data based on the DMRS, if the subframe in which the downlink data is not the MBSFN subframe and the fallback transmission type bit has a second value identifying that the downlink data for the fallback transmission in the subframe is transmitted based on the DMRS.

32. The method of claim 31, wherein the first channel is a physical downlink control channel (PDCCH) and the second channel is an enhanced-physical downlink control channel (E-PDCCH).

33. The method of claim 32, further comprising receiving an ACK/NACK signal with respect to a downlink data transmission from the terminal, wherein receiving the ACK/NACK signal comprises receiving the ACK/NACK signal by using a transmission power set based on a kind of a control channel where the DCI is transmitted.

34. The method of claim 31, further comprising,
if the subframe in which the downlink data is transmitted is not the MBSFN subframe, informing that the downlink data is transmitted based on the at least one of the CRS or the DMRS to the terminal by setting the fallback transmission type bit included in the DCI transmitted based on a DCI format 1A as a predetermined value.

35. The method of claim 31, further comprising,
if the subframe in which the downlink data is transmitted is not the MBSFN subframe, informing that the downlink data is transmitted based on the at least one of the CRS or the DMRS to the terminal through a higher layer signaling.

36. The method of claim 31, wherein an initial state and a port value of a scrambling sequence with respect to the DMRS are informed of to the terminal through a higher layer signaling, if the downlink data is transmitted based on the DMRS.

37. The method of claim 31, wherein an initial state and a port value of a scrambling sequence with respect to the DMRS are used, if the downlink data is transmitted based on the DMRS, and the initial state and the port value are predetermined between the base station and the terminal.

38. The method of claim 31, wherein an initial state and a port value of a scrambling sequence with respect to the DMRS are informed of to the terminal by using a DCI format 1A, if the downlink data is transmitted based on the DMRS.

39. The method of claim 31, further comprising receiving an ACK/NACK signal with respect to a downlink data transmission from the terminal, wherein receiving the ACK/NACK signal comprises receiving the ACK/NACK signal by using a transmission power set based on a kind of the subframe where the downlink data is transmitted.

40. The method of claim 31, wherein the downlink data is transmitted by using a plurality of DMRS ports, if the downlink data is transmitted based on the DMRS.

* * * * *